United States Patent
Cofta et al.

(10) Patent No.: US 7,263,618 B2
(45) Date of Patent: *Aug. 28, 2007

(54) METHOD FOR BINDING A PROGRAM MODULE

(75) Inventors: Piotr Cofta, Arlington, MA (US); Olli Immonen, Helsinki (FI); Mikael Linden, Tampere (FI); Mikko Lukkaroinen, Oulu (FI)

(73) Assignee: Nokia Corporation, Espoo (FI)

( * ) Notice: Subject to any disclaimer, the term of this patent is extended or adjusted under 35 U.S.C. 154(b) by 1269 days.

This patent is subject to a terminal disclaimer.

(21) Appl. No.: 09/739,941

(22) Filed: Dec. 18, 2000

(65) Prior Publication Data

US 2001/0016042 A1    Aug. 23, 2001

(30) Foreign Application Priority Data

Dec. 27, 1999 (FI) .................................. 19992786

(51) Int. Cl.
*H04L 9/32* (2006.01)
*H04K 3/00* (2006.01)
(52) U.S. Cl. .......................................... 713/193; 380/1
(58) Field of Classification Search ................. 719/331, 719/332
See application file for complete search history.

(56) References Cited

U.S. PATENT DOCUMENTS 5,502,766 A * 3/1996 Boebert et al. .............. 713/193
5,615,268 A * 3/1997 Bisbee et al. ................ 713/176
5,757,914 A * 5/1998 McManis .................... 713/187

(Continued)

FOREIGN PATENT DOCUMENTS

EP    0770957 A3    5/1997

OTHER PUBLICATIONS

"Cellular Phone to Mobile Terminal", Nikkei Internet TechnologyNo. 28,Nov. 1999, pp. 74-83, English Translation of p. 78.
JP Kokai No. 6-149583, English translation of parargrapohs 0002, 0006, 0007+00.
JP kokai No. 09-231068, which corresponds to previously cited EP 0770957 A2, no translation.

*Primary Examiner*—Nasser Moazzami
*Assistant Examiner*—Pramila Parthasrathy
(74) *Attorney, Agent, or Firm*—Perman & Green, LLP (57) ABSTRACT

The invention relates to a method for loading a program module (L1, L2, L3) in a terminal, in which one or several programs (A, B) are running, and in which method subroutines (P1, P2, P3) are stored in said program modules (L1, L2, L3). The program modules (L1, L2, L3) are provided with first tags (T1, T2, T3), wherein to start binding, the program makes a call (7) to a subroutine (P1, P2, P3). The call (7) is supplemented with the first tags (T1, T2, T3) to select the program module (L1, L2, L3) for binding, in which the called subroutine (P1, P2, P3) is stored. The tags (T1, T2, T3) are supplemented with second tags (LT1, LT2, LT3). The call (7) is also supplemented with said second call data (PKx, PKy, PKz). In connection with the binding, said first tags (T1, T2, T3) stored in the program modules are compared with the first tags (T1, T2, T3) transmitted in the call (7), and the second tags (LT1, LT2, LT3) are compared with the second call data (PKx, PKy, PKz) transmitted in the call (7), wherein the program module to be bound is selected to be the program module which matches with the first tags (T1, T2, T3) and the second call data (PKx, PKy, PKz) transmitted in the call. The invention also relates to a terminal (MT).

11 Claims, 6 Drawing Sheets

U.S. PATENT DOCUMENTS

| | | | |
|---|---|---|---|
| 5,778,068 A * | 7/1998 | Johnson et al. | 713/189 |
| 5,778,070 A * | 7/1998 | Mattison | 713/191 |
| 5,867,666 A * | 2/1999 | Harvey | 709/239 |
| 6,003,095 A | 12/1999 | Pekowski et al. | 709/305 |
| 6,070,239 A * | 5/2000 | McManis | 713/187 |
| 6,157,721 A * | 12/2000 | Shear et al. | 380/255 |
| 6,223,291 B1 * | 4/2001 | Puhl et al. | 713/201 |
| 6,327,652 B1 * | 12/2001 | England et al. | 713/2 |
| 6,330,588 B1 * | 12/2001 | Freeman | 709/202 |
| 6,343,287 B1 * | 1/2002 | Kumar et al. | 707/4 |
| 6,347,398 B1 * | 2/2002 | Parthasarathy et al. | 717/178 |
| 6,615,350 B1 * | 9/2003 | Schell et al. | 713/168 |
| 6,722,986 B1 * | 4/2004 | Lyons et al. | 463/29 |
| 6,728,880 B1 * | 4/2004 | Sites | 713/178 |

* cited by examiner

METHOD FOR BINDING A PROGRAM MODULE

The present invention relates to a method for binding a program module as set forth in the preamble of the appended claim 1. The invention also relates to a terminal as set forth in the preamble of the appended claim 7.

At present, programs are primarily implemented as having a module structure, wherein one program consists of several program modules. It is thus possible to keep the size of a single program module within limits, and during the use, only such program modules are bound which are used at a time. Such an arrangement facilitates e.g. the maintenance of the programs, reduces the memory capacity required in the data processor using the program, as well as makes it possible for several different programs to use the same program module. To run such a program consisting of modules, a so-called main program is started. When the operation of the main program proceeds, for example on the basis of instructions entered by users, the program module needed at the time is bound from the main program. Below in this specification, the general name program module will be used to refer to such a program component, in connection with which binding can be applied. Such program modules include e.g. program libraries.

Binding refers in this specification to a process related to running of programs, in which a program component, such as a main program or a subroutine, calls another program component, such as a subroutine or a function. Binding can be further divided into so-called coarse-grain binding and fine-grain binding. In coarse-grain binding, a program module is selected, and in fine-grain binding, a subroutine, function or the like is selected from the program module.

Figure 1:
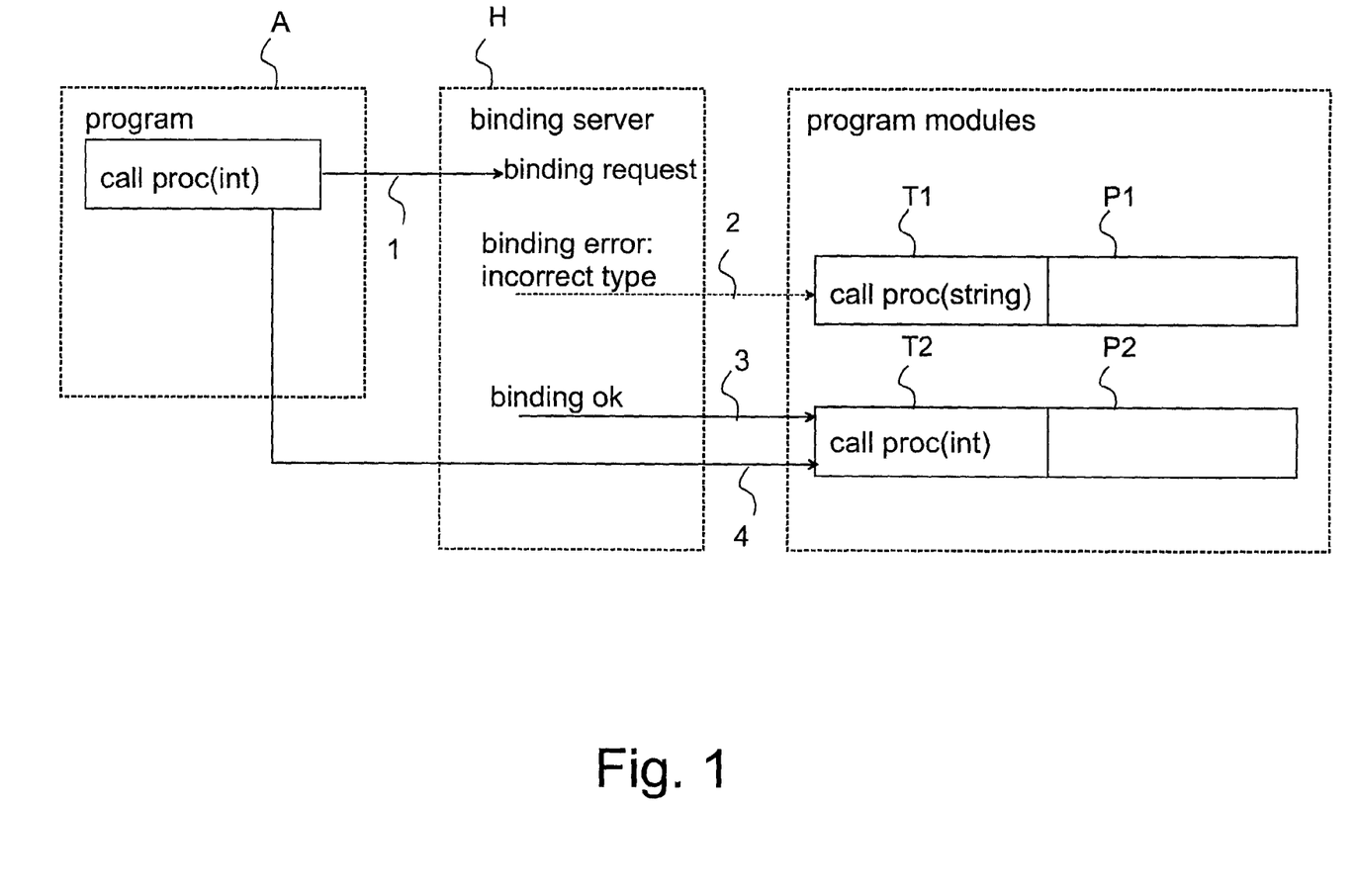
FIG. 1 shows, in a reduced chart, binding of a program module according to prior art.

FIG. 1 shows, in a reduced chart, a way of binding according to prior art. A calling program A comprises a subroutine call 1, in which a tag for the desired subroutine is given as the parameters. This tag T1, T2 typically comprises the name of the subroutine and a list of the types of the subroutine parameters. The binding request is transferred to a binding server H, where the tag is used to find out in which program module the subroutine P1, P2 is located. In this search, it is possible to use e.g. a lookup table which preferably comprises a list of the available program modules L1, L2 and/or the tags T1, T2 of the subroutine P1, P2. If the binding server finds such a program module L1, L2, in which the called subroutine P1, P2 is located, the binding server H will next examine, if the type data of the subroutine correspond to the type data of the called subroutine. In FIG. 1, a broken line 2 indicates a situation, in which the binding server H has found a correct name but the type data do not match. In a corresponding manner, a solid arrow 3 is used to indicate a situation, in which both the name and type data match, wherein the binding server H hands the operation of the program over to said subroutine P2 (arrow 4). This binding server can be implemented e.g. as an operating system function or in connection with the program itself.

The above-described method for binding programs is called dynamic binding, as distinguished from static binding, where subroutine calls and the actual subroutines are linked already at the stage of compiling the program. Static binding can accelerate the operation of the program to some extent, but in this case the whole program must be loaded into the memory means of the data processor before the program can be used. Moreover, the updating of the program to a newer version requires that the whole program is updated.

The program and the program modules required in its operation are usually stored at the stage of installing the program on the memory means of the data processor, typically on a fixed disk. At present, particularly due to an increase in the use of networks, all program modules are not necessarily stored in the same data processor. For example in a local area network, a server computer normally comprises the program modules of all the programs available in the local area network, wherein work stations of the local area network load the program modules needed at the time from the memory means of the server. Also in such a situation, the program modules are typically stored at the stage of installing the program in the memory means of the server. On the other hand, the increased popularity of the Internet data network has made it possible to download the program modules of the program by means of the Internet network e.g. from the home page of the program manufacturer. This downloading can be performed e.g. at the stage when the program is installed in a work station or a server, or at the stage when the program is used. Thus, the work station performs the downloading of the program modules via the Internet data network e.g. from the home page of the program manufacturer. Thus, not nearly all the program modules need to be stored in the work station, wherein storage capacity e.g. on the fixed disk of a work station is left over for other use. Furthermore, the newest program version is always available for the program, wherein the user does not necessarily need to perform updating of the program at the work station.

One disadvantage in binding of such a dynamic program module is that the program can use even such a program module which is not made by the program manufacturer or is not supplied by a manufacturer approved by the manufacturer in question, but it can be a so-called pirate version. To eliminate this drawback, a so-called signature method has been developed, in which the program module is supplemented with a confirmation which is used as an attempt to verify the origin of the program module before installing program module. This confirmation is encrypted with an encryption method known per se, to prevent falsification of the confirmation. However, the confirmation is not made upon running the program but at the stage of installing the program. Furthermore, the confirmation is made by the operating system or another corresponding component in the use environment of the work station, but not by the program itself. Thus, the decision on accepting or rejecting the program module is made by the operating system. If the program module has been once accepted at the work station, also all the other programs can use the program module in question. This situation may cause problems, because the manufacturer of another program may not necessarily accept this program module to be used in connection with a program made by itself.

Another drawback in dynamic binding is that different programs may have program modules and/or subroutines having the same name. In work stations of prior art, however, two program modules with the same name cannot be loaded simultaneously. Thus, the user must take care of changing the program module in a situation when the user switches over to use another program using program modules with the same name.

Figure 2:
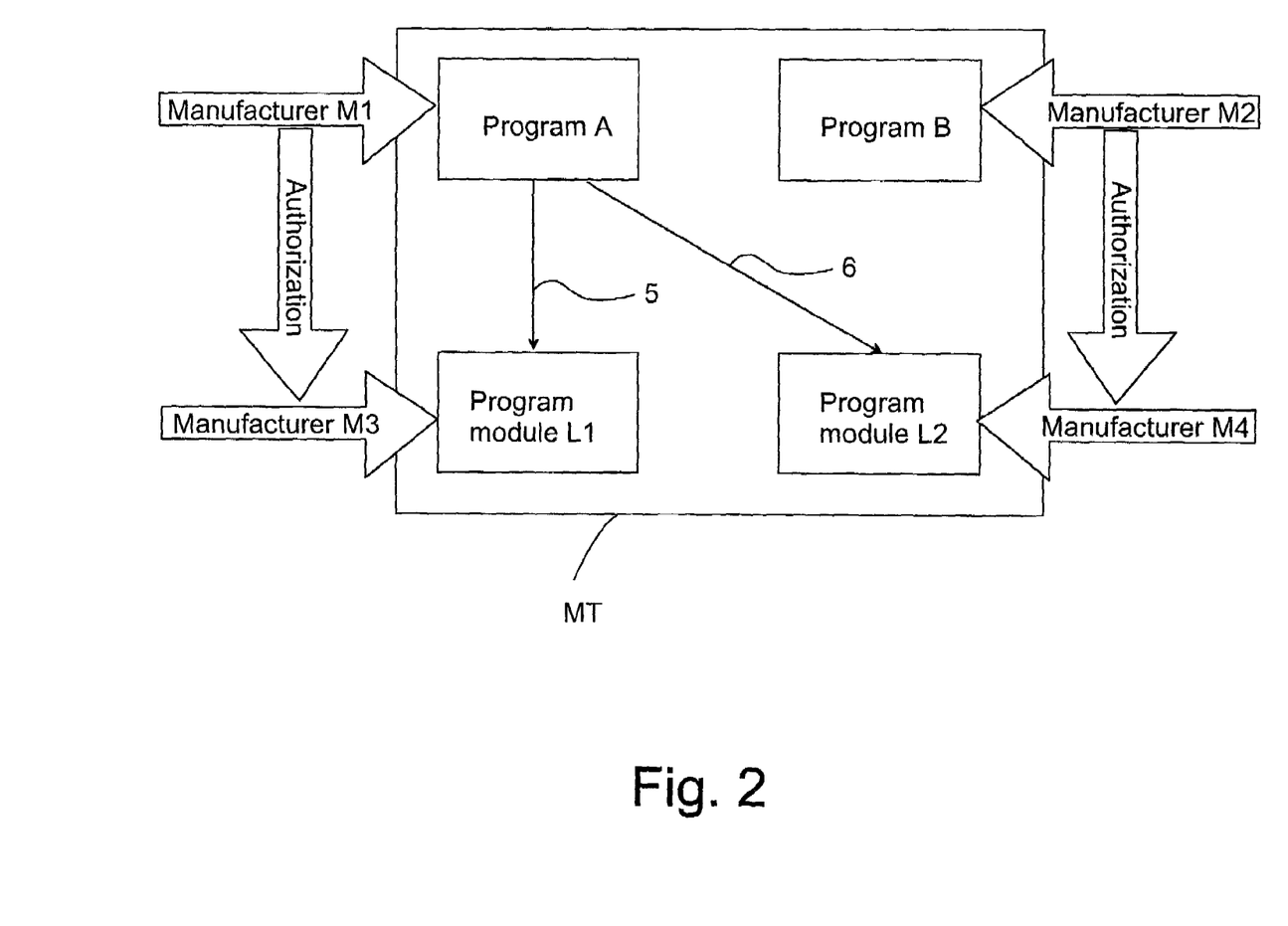
FIG. 2 shows, in a reduced chart, the situation in a work station of prior art in connection with the user of two program modules.

The appended FIG. 2 shows, in a reduced chart, a situation in which two programs A, B are installed in a work station. The first program A is manufactured and supplied by a first manufacturer M1. The second program B is manufactured and supplied by a second manufacturer M2. A program module L1 necessary for the first program A is manufactured by a third manufacturer M3. The first manufacturer M1 has authorized the third manufacturer M3 to supply said program module L1 to be used in the program A. In a corresponding manner, the second manufacturer M2 has authorized a fourth manufacturer M4 to supply a second program module L2 to be used in the second program B. However, the first manufacturer M1 has not authorized the fourth manufacturer M4 to supply the program module L1 in its own program A. In a corresponding manner, the program by the second manufacturer M2 has no authorization to use the program module L1 of the third manufacturer M3, even if these program modules L1, L2 contained substantially the same functionality. Thus, when the user starts the first program A, the user must also load the first program module L1 in the work station. The binding is thus performed from the first program module L1, which is indicated by an arrow 5 in FIG. 2. Nevertheless, binding from the second program module L2 (arrow 6) cannot be performed. In a situation in which the user switches over to use the second program B, the user must also change the first program module L1 in use to the second program module L2 so that the second program B would run in the desired manner.

It is an aim of the present invention to provide a dynamic method for binding a program module, to make it possible to have several program modules with the same name available for use simultaneously in a work station. The program module required by each program is identified and verified by means of an auxiliary tag. The method according to the present invention is characterized in what will be presented in the characterizing part of the appended claim 1. The work station according to the present invention is characterized in what will be presented in the characterizing part of the appended claim 7. The invention is based on the idea that the program module is supplemented with an auxiliary tag, which can be used to identify a desired program module and also to verify that it is a program module supplied by the program manufacturer or by an authorized manufacturer.

Significant advantages are achieved by the present invention when compared with solutions of prior art. The method according to the invention makes it possible to use two or more program modules with the same name simultaneously, wherein the user does not need to take any measures to change the program module. This simultaneous use of program modules can even be implemented in such a way that the user does not even need to know about such a function. Furthermore, the invention has the advantage that the supplier of the program module can be confirmed, whereby the use of program modules by unreliable program suppliers can be avoided. The confirmation is executed in the calling program or is started up by the same, wherein the confirmation is an operation independent of the use environment.

In the following, the invention will be described in more detail with reference to the appended drawings, in which.

WAP (Wireless Application Protocol) is an arrangement determined by the WAP Forum for implementing access to the Internet data network and sophisticated data services in mobile terminals. WAP offers an entity which is, in principle, scalable and expandable, and in whose layer-structured architecture a certain protocol layer offers services for the next layer. WAP architecture is very close to the WWW model known from the Internet data network, but it contains some optimizations and changes required by the wireless environment.

Figure 5:
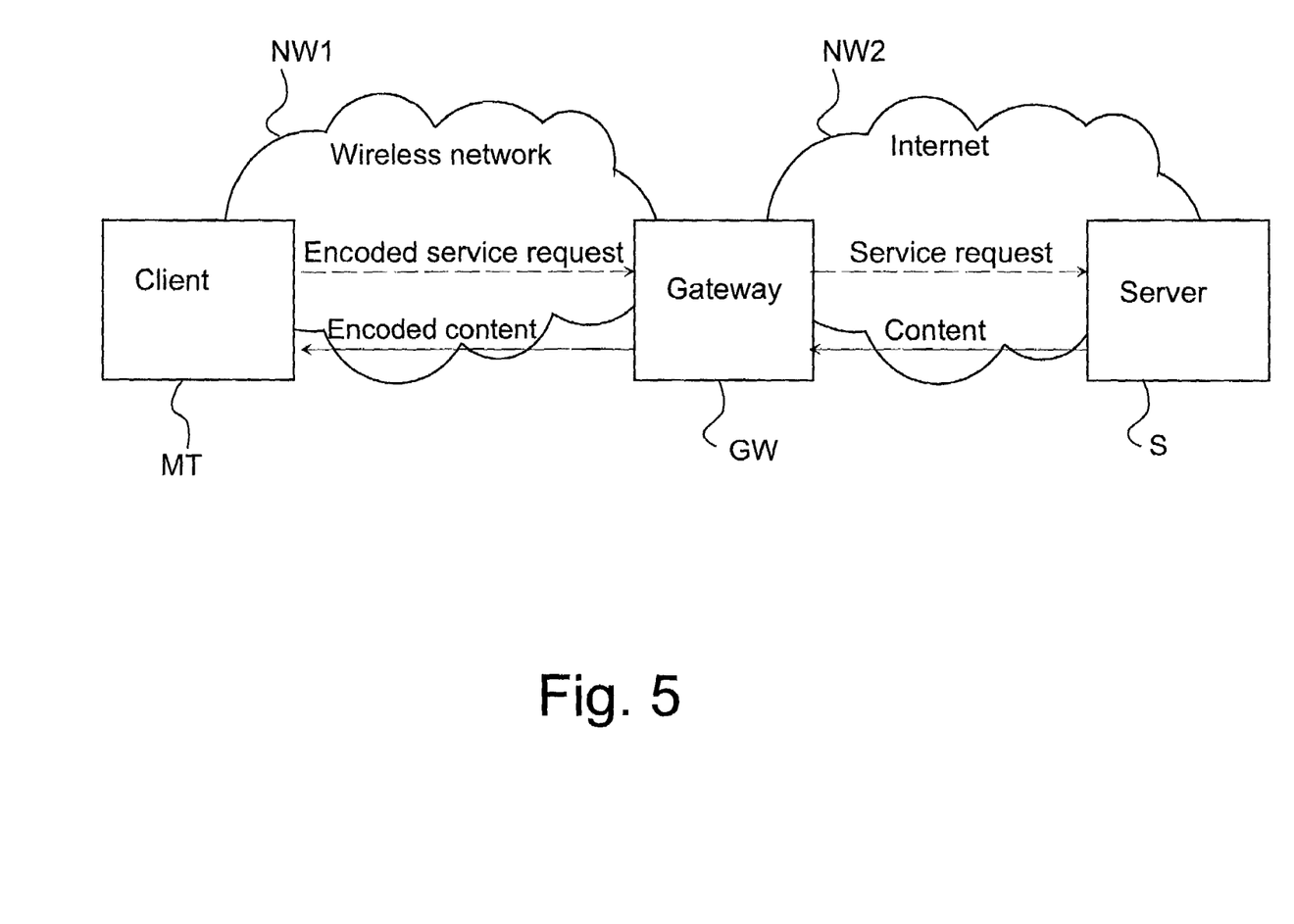
FIG. 5 shows a WAP model in a skeleton diagram.

The appended FIG. 5 shows a skeleton diagram of a WAP model which makes communication possible between a client work station MT and a server S, to offer the reader a data object used at the server S in an intelligible format. The client work station MT transmits an encoded service request over a wireless communication network NW1 to a gateway GW, which the gateway GW decodes and transmits via the Internet data network NW2 to the server S. The server S transmits the requested content to the gateway GW, which codes the content and transmits it to the client that made the service request. The received data object can be printed out to be reviewed by the client by means of the user interface in connection with the client.

Figure 6:
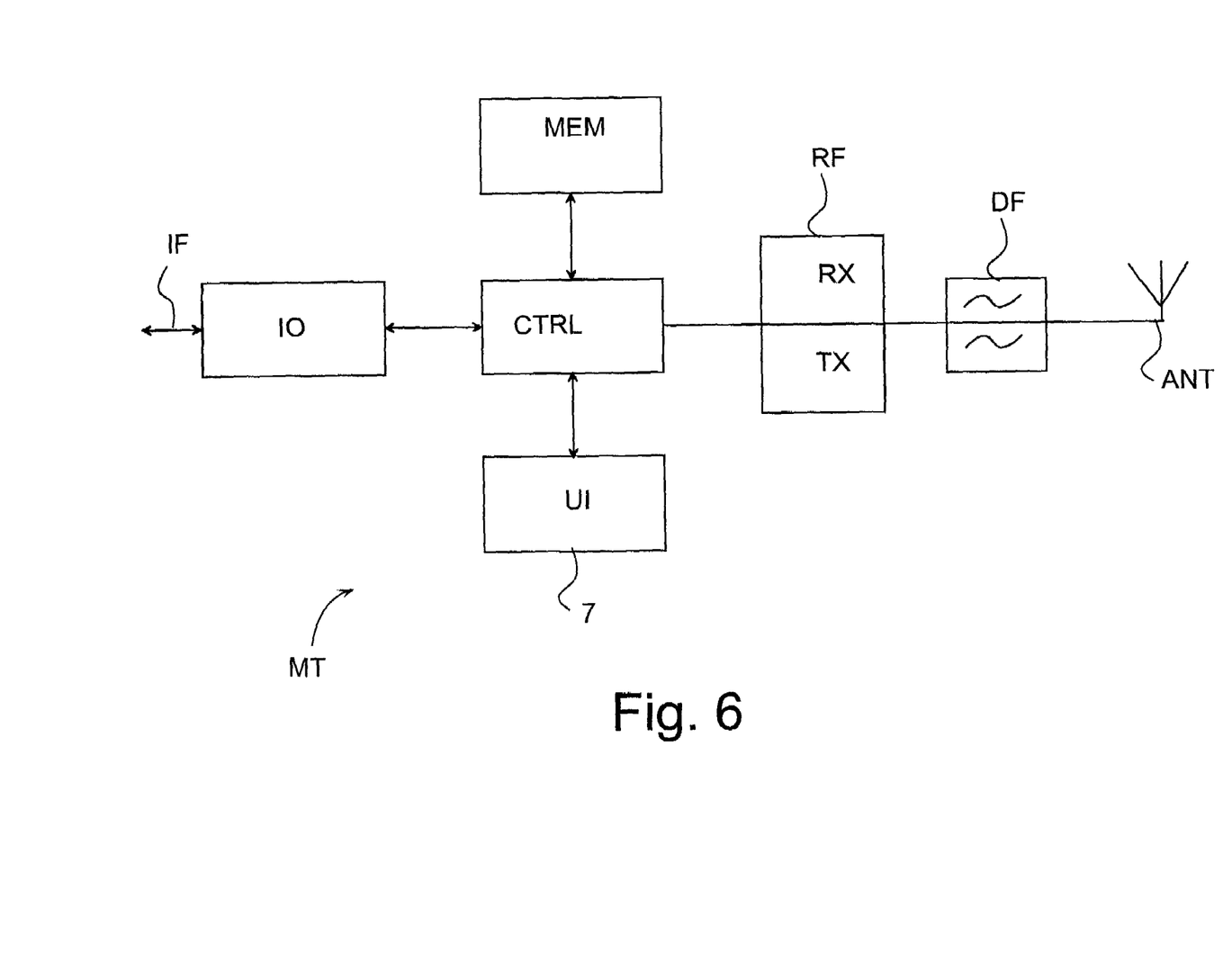
FIG. 6 shows, in a reduced chart, a terminal according to a preferred embodiment of the invention.

FIG. 6 illustrates, in a reduced block chart, a mobile terminal MT used as a client work station. In the present embodiment, the terminal used is a wireless communication device, such as a mobile station, but it is obvious that the invention can also be applied in connection with other types of work stations and mobile terminals. The mobile station can be any wireless communication means, such as e.g. a duplex paging device, a wireless PDA device (Personal Digital Assistant), a WLAN (Wireless Local Area Network) terminal using the IP protocol, or a portable computer equipped with a mobile communication network card to be inserted in the hardware port and comprising an antenna.

The mobile station shown in the block chart of FIG. 6 comprises, for communication via the radio channel, a radio part RF which normally comprises, in a way known from a conventional mobile station, a transmitter branch TX (comprising the functional blocks which perform channel coding, interlacing, encryption, modulation, and transmission), a receiver branch RX (comprising the functional blocks which perform reception, demodulation, decryption, de-interlacing, and channel decoding), a duplex filter DF for separating reception and transmission, and an antenna ANT for transmission on the radio channel. The operation of the terminal as a whole is controlled by a central unit CRTL which also implements the functionalities complying with the protocol of the terminal. The mobile station comprises a memory MEM, which contains preferably a volatile and a non-volatile memory, and an interface unit IO comprising one or several hardware ports for connecting internal or external auxiliary devices to the mobile station. For communication with the user, the work station comprises a user interface which typically comprises a keypad, a display, a microphone, and a speaker. In connection with data processing programs, the interface unit comprises communication means for transmitting data between the data processor, such as a portable computer, and the mobile station. These data processing functions can also be implemented in the mobile station, for example in a communicator-type device, wherein some of the functions of the terminal can be common to both the mobile station and the data processing functions. The connection with the server is implemented via a radio unit. The central unit controls the implementation of the mobile station functions by performing the functions arranged as software in the memory of the device or in the hardware structure, and preferably the functions of the program code loaded from the server to the terminal.

The internal structure of the program modules can vary in practical applications. In an advantageous alternative, a certain predetermined area is allocated for the tags of the subroutines. Thus, preferably in connection with these tags, there is also information about the location in the program module where the program code of the subroutine starts. In another advantageous alternative, the tag of each subroutine is in connection with the program code of the subroutine. Thus, in connection with the tags, there is also information about the location of the tag of the next subroutine in the program module. In view of the present invention, it is not significant as such, how the tags and subroutines are arranged in the program modules.

Figure 3:
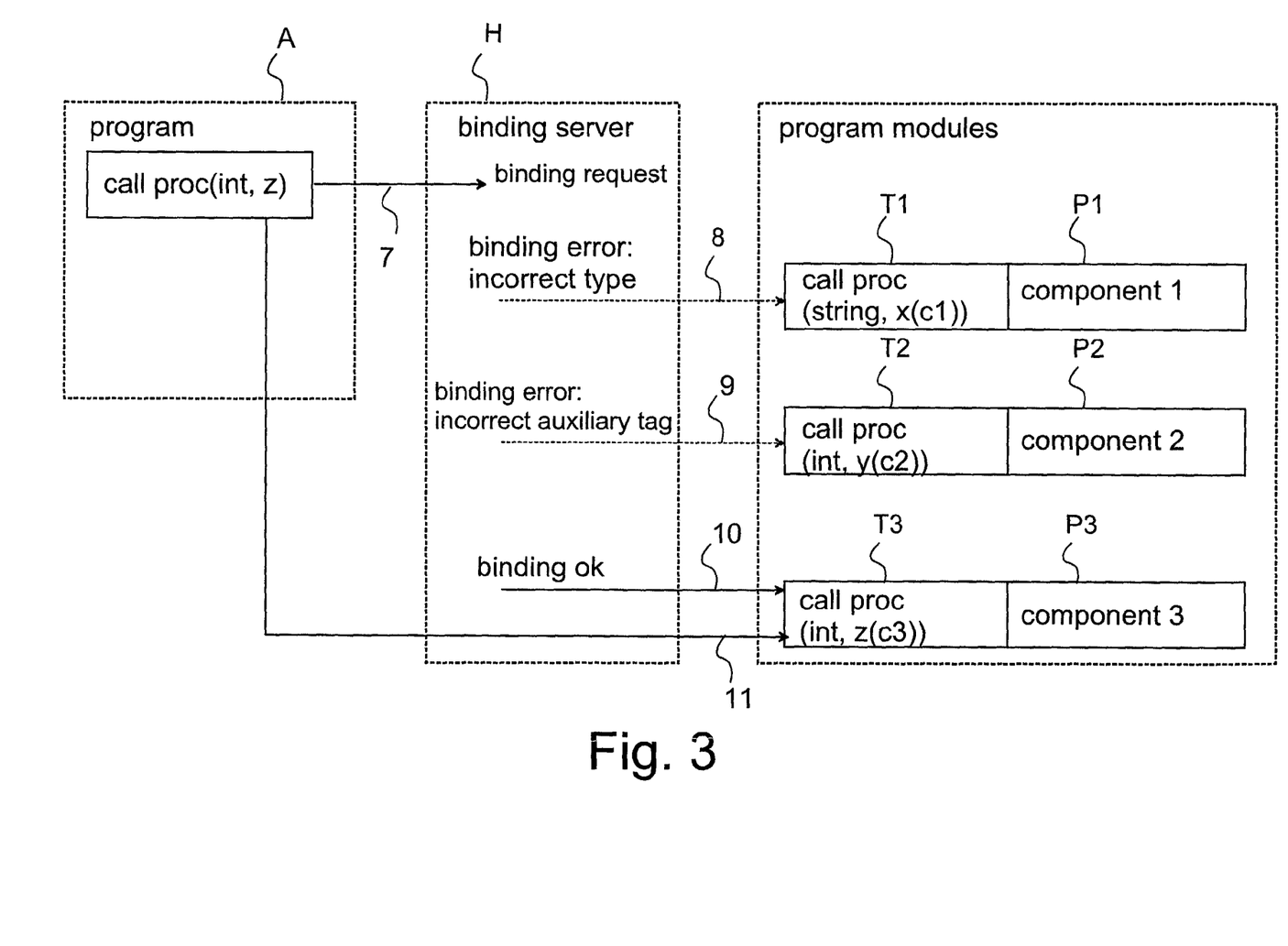
FIG. 3 shows, in a reduced chart, the method according to a preferred embodiment of the invention applied in a work station.

We shall next describe the operation of an advantageous embodiment of the invention with reference to FIG. 3. The user starts the main program of a program A with a module structure in a terminal MT. After this, the main program is run, until there is a call 7 in the program running to a subroutine which is not located in the same program module as the main program. Thus, the terminal MT moves on to execute a binding server H which can be implemented e.g. in the program being run, or as an operating system function in the terminal MT. In connection with the subroutine call 7, information is transmitted to the binding server H about the name, subroutine parameters and auxiliary code of the subroutine to be called. The binding server uses this information to determine the subroutine P1, P2, P3 to be called from the tags T1, T2, T3 of the subroutines stored in the program modules, preferably in the following way.

On the basis of the name of the program module in the tag T1, T2, T3, the binding server H searches for said program module for examination, which is known per se. After the program module has been found, the binding server compares the tag of one subroutine from a predetermined location with the data transmitted in the subroutine call. At this stage, the name of the subroutine and the type data of the parameters are preferably examined. If both the name and the type data match, the auxiliary tag according to the invention is still examined. On the basis of this auxiliary tag, it is possible to determine whether the program module under examination has been approved by the manufacturer of the program being run. In this examination, it is possible to use various methods, one of which will be described in more detail below in this description. The same program module can also contain more than one of these auxiliary tags, wherein several manufacturers can approve the same program module. The calling program can also transmit its own function, whereby the confirmation on the basis of the auxiliary tag can be performed.

If it is found at the stage of examining the auxiliary tag that the program module in question is supplied by such a manufacturer that it can be used in connection with the program to be run, the next step is to run this subroutine. Nevertheless, if it is found that the program module in question is not supplied by a manufacturer authorized by the manufacturer of the program to be run (arrow 8), the next step is to examine another program module with the same name, if there is one. This second program module is examined to find out if it contains a called subroutine in which the parameter type data match. If such a subroutine is found, the auxiliary tags contained by the program module are also examined to find out the manufacturer of the program module. If the auxiliary tag does not match, the program module in question is not one by an authorized manufacturer (arrow 9). However, if one of the examined auxiliary tags indicates that the program module in question is one supplied by an authorized manufacturer (arrow 10), the next step is to run this subroutine (arrow 11), which is indicated with the reference P3 in FIG. 3.

The above-presented steps are preferably iterated as long as the desired program module is found, or until all the program modules with a certain name have been examined. In this context, it should also be mentioned that the program module can be searched for in several different locations. For example, the search can be started in the terminal memory MEM. After this, the search can be expanded to the memory means of a local area network NW1, if the terminal is coupled to communicate with a local area network. Furthermore, the program module can be searched for in the Internet network in a way known per se. In connection with the wireless terminal MT, said WAP protocol can be preferably applied in the search and the binding.

Figure 4:
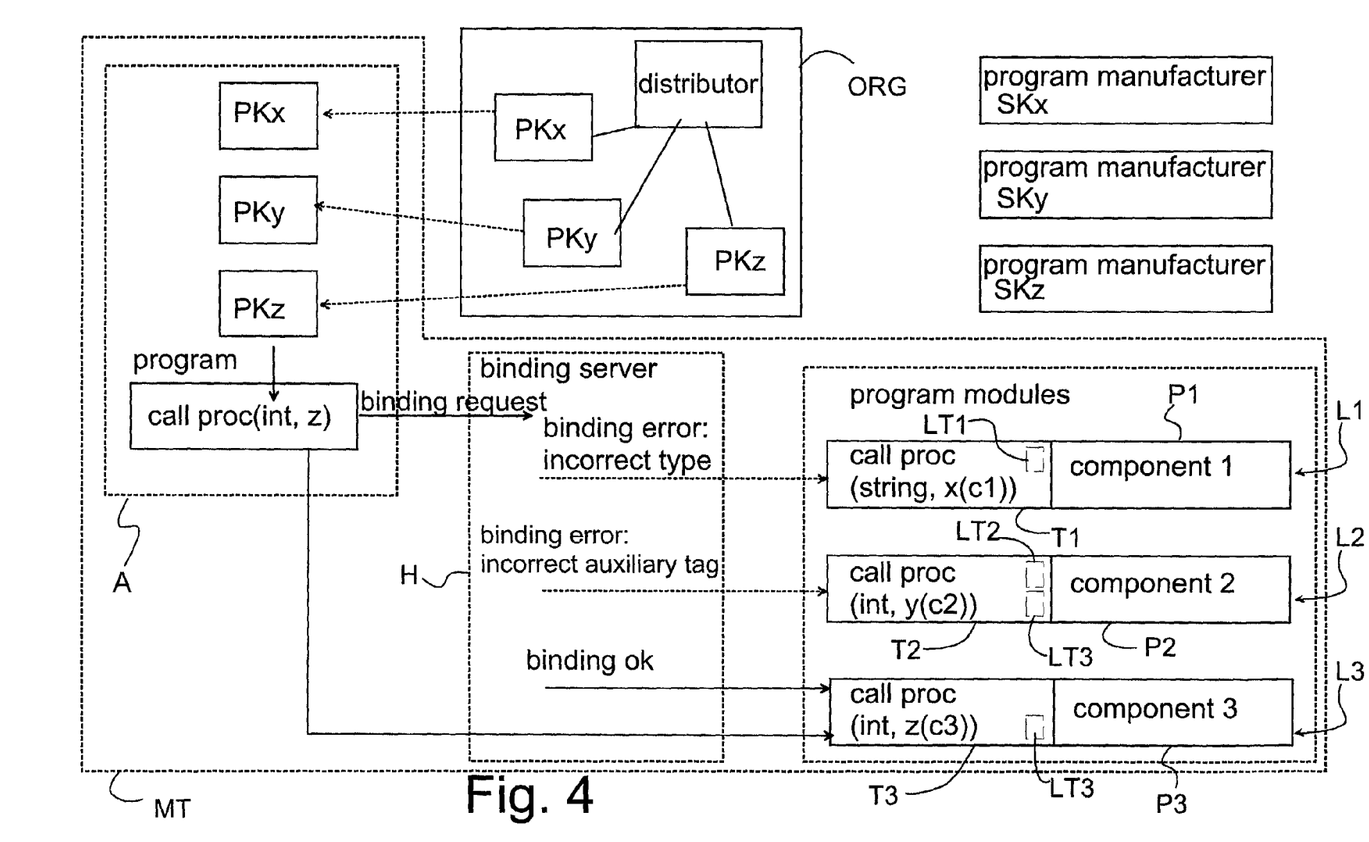
FIG. 4 shows, in a reduced manner, the binding function in connection with the method according to a preferred embodiment of the invention.

In the following, an advantageous embodiment of an auxiliary tag will be described in more detail with reference to the skeleton diagram of FIG. 4. In this implementation, a digital signature is used, which is formed e.g. by asymmetric encryption. Asymmetric encryption is based on the key pair of a secret key and a public key. Each program manufacturer M1, M2, M3 applying asymmetric encryption has one or more secret keys. These are indicated with the references SK1, SK2 and SK3 in FIG. 4. For clarity, FIG. 4 only shows three manufacturers and one key pair for each manufacturer, but it is obvious that in practice, there are considerably more manufacturers and key pairs than those presented here. In the example of FIG. 4, the first manufacturer M1 has supplemented the first program module L1 with an auxiliary tag which comprises a digital signature formed by a first secret key SK1. As an example, this auxiliary tag is illustrated with the reference LT1 in the appended FIG. 3, but it is obvious that the format of the auxiliary tag can vary in practical applications. The second manufacturer M2 has supplemented a second program module L2 with an auxiliary tag LT2 which comprises a digital signature formed by a second secret key SK2. Furthermore, a third manufacturer M3 has supplemented this second program module L2 with an auxiliary code LT3 which comprises a digital signature formed by a third secret key SK3. Thus, this second program module L2 is approved by both the second M2 and the third manufacturer M3. The third manufacturer M3 has supplemented also a third program module L3 with the auxiliary tag LT3 which comprises a digital signature formed by the third secret key SK3. The tag T3 of this third program module L3 is the same as the tag T2 of the second program module L2. Consequently, for the auxiliary tags, the difference lies in that the auxiliary tag of the third program module L3 does not contain the digital signature of the second manufacturer.

In the terminal or in each program, in which the present invention is applied, the user of the terminal MT has stored public keys PK1, PK2, PK3 of the manufacturer/manufacturers. The distribution of the public key can be arranged e.g. by using a distribution organization ORG which is evaluated as reliable and to which the manufacturers give their public keys and from which the user can obtain them. The public key can be used to perform the above-mentioned examination of the auxiliary tag, i.e. to secure that the digital signature is really formed by the secret key corresponding to the public key. The public keys are stored in such a way that they are available for use of the program when the program is being run. In connection with each binding, such keys are selected from the public keys that correspond to the manufacturers which have authorized the use of the program module to be bound. For example, in the situation of FIG. 4, only the public key PK3 of the third manufacturer M3 is selected.

One alternative for storing public keys is a so-called intelligent card (not shown). The intelligent card is connected to communicate with the terminal MT e.g. via an interface bus IF (FIG. 6), wherein the terminal MT can read public keys stored on the intelligent card, when necessary.

The digital signature can be preferably formed by an RSA algorithm, known per se, in which the signature is implemented by an encryption operation. There are also other known methods, such as the DSA (Digital Signature Algorithm), ECDSA (Elliptic Curve Digital Signature Algorithm), in which the digital signature is performed in another way.

The present invention can be applied in such programming environments which use dynamic binding. Examples of such environments which should be mentioned in this context are CORBA and Java. In practical applications, the details of the method according to the invention depend on the application environment. In the CORBA programming environment, a bind( ) function is available for dynamic binding. Thus, in connection with the function call it is possible to transmit a tag and an auxiliary tag. Calling the bind( ) function activates the binding server, wherein the binding server can examine the information transmitted in connection with the call.

In the Java programming environment, in connection with binding, method tags are used which are formed of subroutine titles and parameter types. These tags are examined at the latest at the stage when binding must be performed. Thus, the examination is performed by an operating part of the Java virtual machine corresponding to the binding server H. The method of the invention can thus be applied in the Java environment e.g. by supplementing the tag with an auxiliary tag and forming a function in the Java virtual machine to verify the auxiliary tag.

The present invention is not limited solely to the embodiments presented above, but it can be modified within the scope of the appended claims.

The invention claimed is:

1. A method for dynamically binding a program module in a terminal, in which one or several programs are running, said method comprising:
storing subroutines in said program module,
providing the program module with a subroutine name and parameters tag,
starting the binding by the program making a call to a subroutine,
supplementing the call with subroutine name and parameters data to select the program module for binding, in which the called subroutine is stored,
supplementing the subroutine name and parameters tag with an auxiliary tag,
supplementing the call with a public key,
comparing said subroutine name and parameters tag stored in the program module with the subroutine name and parameters data transmitted in the call, comparing the auxiliary tag with the public key transmitted in the call, and
selecting the program module to be bound to be the program module which matches with the subroutine name and parameters data and the public key transmitted in the call.

2. The method according to claim 1, wherein the auxiliary tag to be formed in the program module contains a digital signature.

3. The method according to claim 2, further comprising verifying the digital signature of the public key formed in the program module.

4. The method according to claim 1, further comprising storing the auxiliary tag to be formed in the program module in an encrypted form.

5. The method according to claim 1, further comprising storing the program module in a server communicating with a digital network, wherein the terminal used is a mobile terminal, and performing the binding of the program module at least partly by messages complying with the WAP protocol.

6. A terminal comprising:
means for dynamically binding a program module, in which program module contains at least one stored subroutine and a subroutine name and parameters tag,
means for running programs,
means for starting binding by performing in the program a call to a subroutine, the call being supplemented with subroutine name and parameters data to select that program module for binding in which the called subroutine is stored, wherein the program module contains a stored auxiliary tag;
means for adding a public key to the call,
means for comparing said subroutine name and parameters tag stored in the program module with the subroutine name and parameters data transmitted in the call,
means for comparing the auxiliary tag with the public key transmitted in the call, and
means for selecting a program module to be bound on the basis of said comparison,
wherein the program module to be bound to be the program module which matches with the subroutine name and parameters data and the public key transmitted in the call.

7. The terminal according to claim 6, wherein the auxiliary tag formed in the program module contains a digital signature.

8. The terminal according to claim 7, wherein on the basis of said public key the digital signature of the auxiliary tag formed in the program module is verified.

9. The terminal according to claim 6, further comprising means for binding a program module stored in a server communicating with the Internet network, wherein the terminal is a mobile terminal, and said mobile terminal comprises means for performing binding of the program module at least partly by messages complying with the WAP protocol.

10. A method in a terminal, in which one or several programs are running, said terminal comprising at least one program module, which is provided with a subroutine name and parameters tag and an auxiliary tag, and said at least one program module comprises at least one subroutine, wherein the method comprises:
making a call by the program to a subroutine;
supplementing the call with first call data to select a program module for dynamically binding among said at least one program module, in which the called subroutine is stored;

supplementing the call with a public key in connection with the binding;

comparing said subroutine name and parameters tag stored in said at least one program module with the subroutine name and parameters data transmitted in the call;

comparing the auxiliary tag with the public key transmitted in the call; and selecting the program module for binding to be the program module in which the subroutine name and parameters tag matches with the subroutine name and parameters data and the auxiliary tag matches with the public key.

11. A terminal comprising:

a binding server for dynamically binding a program module, which program module contains at least one subroutine, a subroutine name and parameters tag and an auxiliary tag;

an element for running programs and configured to:

perform in the program a call to a subroutine, supplementing the call with subroutine name and parameters data to select that program module for binding in which the called subroutine is stored;

supplementing the call with a public key;

comparing said subroutine name and parameters tag stored in the program module with the subroutine name and parameters data transmitted in the call;

comparing the auxiliary tag with the public key transmitted in the call; and selecting a program module to be bound on the basis of said comparison, wherein the program module to be bound to be the program module which matches with the subroutine name and parameters data and the public key transmitted in the call.

* * * * *